United States Patent
Son et al.

(10) Patent No.: US 9,502,733 B2
(45) Date of Patent: Nov. 22, 2016

(54) ELECTRODE ASSEMBLY AND SECONDARY BATTERY HAVING THE SAME

(75) Inventors: Suk-Jung Son, Suwon-si (KR); Chan-Jung Kim, Suwon-si (KR); Yun-Kyung Jo, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1225 days.

(21) Appl. No.: 12/379,598

(22) Filed: Feb. 25, 2009

(65) Prior Publication Data

US 2009/0317700 A1    Dec. 24, 2009

(30) Foreign Application Priority Data

Jun. 18, 2008    (KR) ................. 10-2008-0057329

(51) Int. Cl.
| | |
|---|---|
| H01M 2/18 | (2006.01) |
| H01M 10/04 | (2006.01) |
| H01M 2/16 | (2006.01) |
| H01M 10/0587 | (2010.01) |
| H01M 2/02 | (2006.01) |

(52) U.S. Cl.
CPC ....... *H01M 10/0431* (2013.01); *H01M 2/1673* (2013.01); *H01M 2/18* (2013.01); *H01M 10/0587* (2013.01); *H01M 2/0217* (2013.01)

(58) Field of Classification Search
CPC .......... H01M 2/168; H01M 10/0481; H01M 2/1673; H01M 2/18; H01M 2/0217; H01M 10/0587; H01M 10/0431
USPC ................................... 429/94, 163
See application file for complete search history.

(56) References Cited

U.S. PATENT DOCUMENTS

| | | | |
|---|---|---|---|
| 2003/0087150 A1 | 5/2003 | Chung | |
| 2009/0113697 A1* | 5/2009 | Yamamoto et al. | ......... 29/623.1 |

FOREIGN PATENT DOCUMENTS

| | | |
|---|---|---|
| GB | 2088118 | * 11/1980 |
| JP | 2001-319679 | 11/2001 |
| JP | 2003-303624 | 10/2003 |
| JP | 2004-214174 | 7/2004 |
| JP | 2004-253330 | 9/2004 |
| JP | 2005-216754 | 8/2005 |
| JP | 2007-073317 | 3/2007 |
| KR | 1020030037565 A | 5/2003 |
| KR | 10-2006-0102750 | 9/2006 |
| KR | 10-2007-0025682 | 3/2007 |
| KR | 10-2007-0101444 | 10/2007 |

OTHER PUBLICATIONS

Korean Office Action issued on Jul. 16, 2010 in the corresponding Korean Patent Application No. 10-2008-0057329 and Request for Entry of the Accompanying Document herewith.

* cited by examiner

*Primary Examiner* — Milton I Cano
*Assistant Examiner* — Stephen Yanchuk
(74) *Attorney, Agent, or Firm* — Robert E. Bushnell, Esq.

(57) ABSTRACT

A secondary battery includes an electrode assembly designed to prevent an internal short circuit. The electrode assembly includes an electrode group formed by stacking and winding a first electrode plate, a separator and a second electrode plate, and a tape is attached to upper and lower parts of an end of the electrode group. An end of the separator is exposed externally, and the tape is attached to upper and lower parts of the end of the separator. Furthermore, a secondary battery having the electrode assembly is provided.

8 Claims, 3 Drawing Sheets

ELECTRODE ASSEMBLY AND SECONDARY BATTERY HAVING THE SAME

CLAIM OF PRIORITY

This application makes reference to, incorporates the same herein, and claims all benefits accruing under 35 U.S.C. §119 from an application for Electrode Assembly and Secondary Battery Using the Same earlier filed in the Korean Intellectual Property Office on the 18 Jun. 2008 and there duly assigned Serial No. 10-2008-0057329.

BACKGROUND OF THE INVENTION

1. Technical Field

The present invention relates to a secondary battery, and more particularly, to a secondary battery having an electrode assembly which can prevent an internal short circuit.

2. Related Art

Various batteries are used as power sources for electric appliances, and particularly, lithium secondary batteries are widely used as power sources for compact electric appliances because they can realize high capacity with small volume, they have a high energy density per unit area, and they are rechargeable.

Lithium secondary batteries are formed by accommodating an electrode assembly, which is formed by stacking and winding positive and negative electrode plates formed by applying active materials to positive and negative electrode collectors, respectively. A separator is disposed between both electrode plates, and an electrolyte is injected into a cell case and the cell case is sealed.

Lithium secondary batteries may be classified into a cylindrical type, a rectangular type and a pouch type, depending on the shape of the cell case.

Generally, to accommodate the electrode assembly in the cell case, the electrode assembly is wound, and then surrounded by tape to hold the electrode assembly is a wound state.

That is, the tape laterally surrounds the electrode assembly which is formed by winding the positive electrode, the separator and the negative electrode to cover an end of the wound electrode assembly.

In this respect, the completely wound electrode assembly is held by tape attached to the positive electrode plate, i.e., an outermost layer.

Accordingly, when the separator formed of resin is contracted in a lateral direction of the electrode assembly, which is the vertical direction, due to charge or discharge of the battery, or thermal impact, the positive and negative electrode plates are in contact with each other in an empty space formed by the contraction of the separator, causing an electrical short circuit to occur.

Particularly, the electrode assembly is severely exposed to heat and is heated at upper and lower parts so that the contraction of the separator can be easily generated at upper and lower parts of its end.

SUMMARY OF THE INVENTION

The present invention provides an electrode assembly which can prevent contraction of a separator and a short circuit between a first electrode and a second electrode by attaching tape to upper and lower parts of an end of a wound separator, or by attaching tape to completely cover the end of the separator, and a secondary battery having the electrode assembly.

According to an embodiment of the present invention, an electrode assembly includes an electrode group formed by stacking and winding a first electrode plate, a separator and a second electrode plate, and a tape is attached to upper and lower parts of an end of the electrode group. In the latter regard, an end of the separator is exposed outside, and the tape is attached to upper and lower parts of the end of the separator.

According to another embodiment of the present invention, a secondary battery includes an electrode assembly which includes an electrode group formed by stacking and winding a first electrode plate, a separator and a second electrode plate, and a tape is attached to upper and lower parts of an end of the electrode group. In the latter regard, an end of the separator is exposed externally, and the tape is attached to upper and lower parts of the end of the separator.

The upper and lower parts of the end of the separator may be fixed to an outermost electrode plate of the electrode group by the tape.

The end of the separator may cover an end of the outermost electrode plate of the electrode group.

The tape may be further attached to a part of the end of the electrode group other than the upper and lower parts thereof.

The tape may laterally surround an outer surface of the electrode group, including the end of the electrode group, along a winding direction of the electrode group.

The tape may be attached so as to completely cover the end of the electrode group.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
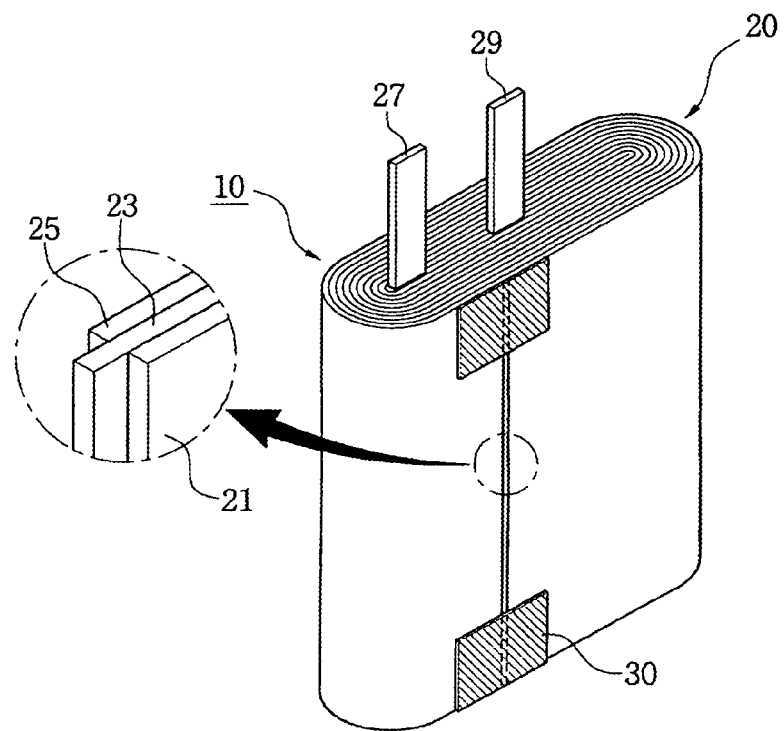
FIGS. 1 thru 4 are perspective views of various electrode assemblies according to an exemplary embodiment of the present invention.

Reference will now be made in detail to the embodiments of the present invention, examples of which are shown in the accompanying drawings, wherein like reference numerals refer to like elements throughout. The embodiments are described below in order to explain the present invention by referring to the figures.

In the drawings, the thickness and length of a region may be exaggerated for clarity.

FIGS. 1 thru 4 are perspective views of various electrode assemblies according to an exemplary embodiment of the present invention.

Referring to FIG. 1, an electrode assembly 10 includes an electrode group 20 formed by sequentially stacking and winding a first electrode plate 21, a separator 23 and a second electrode plate 25.

In the present embodiment, the first electrode plate 21 is the outermost layer of the electrode group 20, but alternatively the second electrode 25 may be the outermost layer of the electrode group 20.

At an end of the electrode group 20, an end of the separator 23 protrudes more than ends of the first and second electrode plates 21 and 25, and thus is exposed outside.

Furthermore, the electrode assembly 10 includes a tape 30 attached to the end of the electrode group 20 and holding the first electrode plate 21, the separator 23 and the second electrode plate 25 in a wound state.

Since, as described above, the end of the separator 23 is exposed outside, when the tape 30 is attached to the end of the electrode group 20, the exposed end of the separator 23 is attached and fixed to the first electrode plate 21, i.e., an outermost layer of the electrode group 20, by the tape 30.

In this case, the tape 30 is attached to upper and lower parts of the end of the electrode group 20, so that upper and lower parts of the end of the separator 23 are attached and fixed to the first electrode plate 21.

Thus, contraction which occurs at the upper and lower parts of the separator 23 can be prevented, and a short circuit between the first and second electrode plates 21 and 25 can also be prevented.

Figure 2:
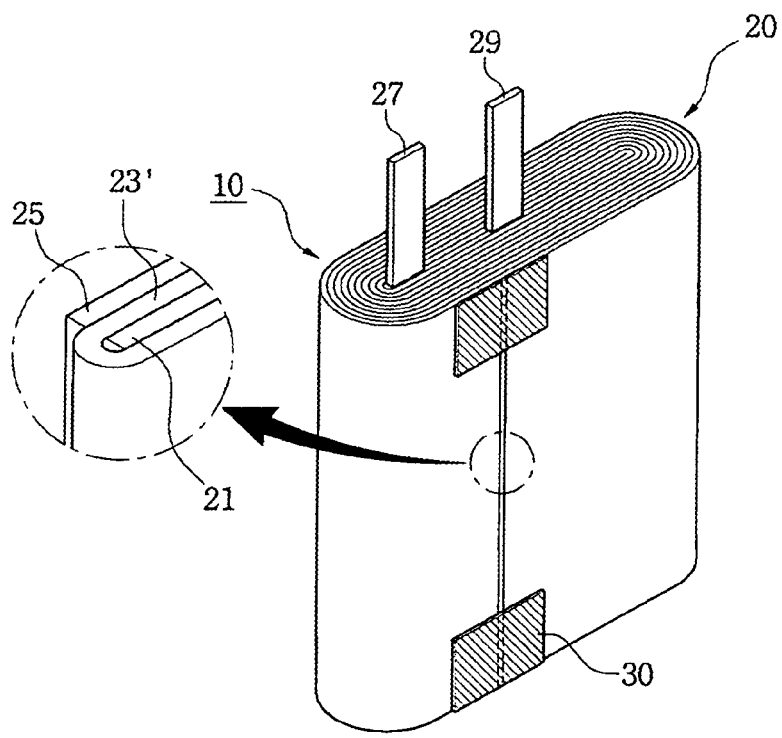

As illustrated in FIG. 2, an end of a separator 23' may be folded backward with respect to a winding direction of the electrode group 20 so that it covers an end of the first electrode plate 21 disposed on the separator 23', e.g., at the outermost layer of the electrode group 20.

Figure 3:
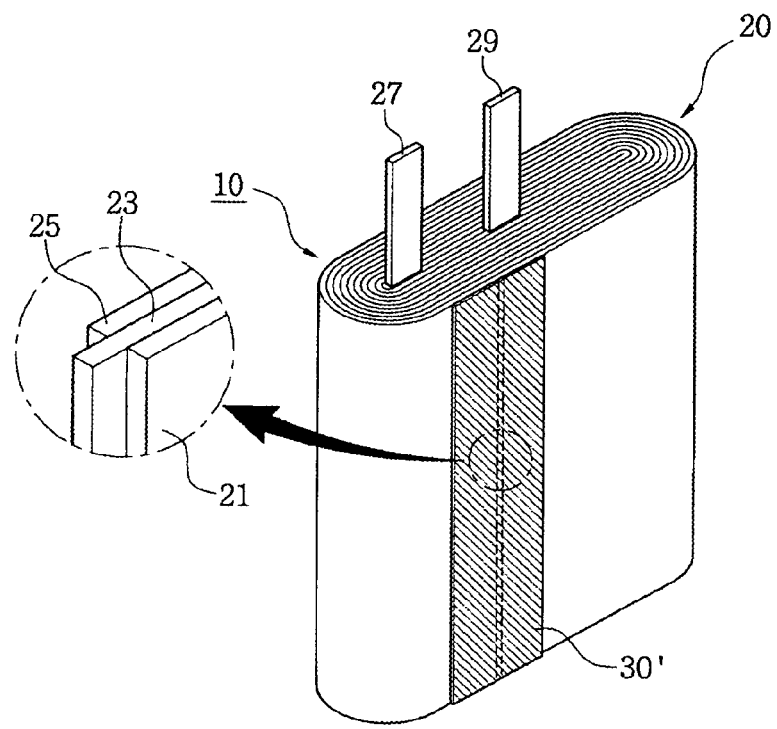

As illustrated in FIG. 3, a tape 30' may be further attached to a part of an end of the electrode group other than the upper and lower parts thereof, and the tape 30' may be attached so as to completely cover the end of the electrode group 20.

In this case, the tape 30' may be formed in one piece, or several pieces.

Figure 4:
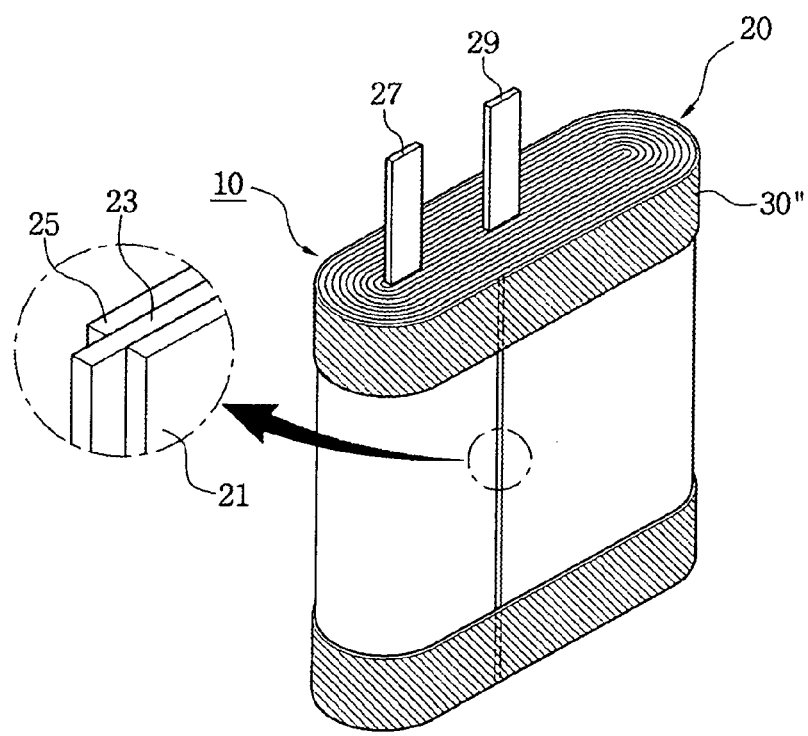

As illustrated in FIG. 4, a tape 30" may be attached so as to completely surround an outer surface of the electrode group 20, including the end thereof, along a winding direction of the electrode group 20.

Accordingly, exposed upper and lower parts of the ends of the separators 23 and 23', or the entire region including the upper and lower parts, are attached and fixed to the first electrode plate 221, i.e., the outermost electrode plate of the electrode group 20, by the tapes 30' and 30".

The first electrode plate 21 and the second electrode plate 25 are formed by applying positive and negative electrode active materials to positive and negative electrode collectors, respectively, so as to have opposite polarities.

The first and the second electrode plates 21 and 25 include non-coating portions in which the positive and negative electrode active materials are not applied, and first and second electrode tabs 27 and 29 are attached to the non-coating portions for electrical communication between both electrode plates 21 and 25, respectively.

For a positive electrode plate, lithium transition metal oxide may be used as an active material, and an aluminum plate may be used as a collector.

For a negative electrode plate, carbon or carbon complex may be used as the active material, and a copper plate may be used as the collector.

The separator 23 can prevent a short circuit between the first and second electrode plates 21 and 25, and may be formed of a polyolefin microporous membrane, such as polyethylene or polypropylene.

Figure 5:
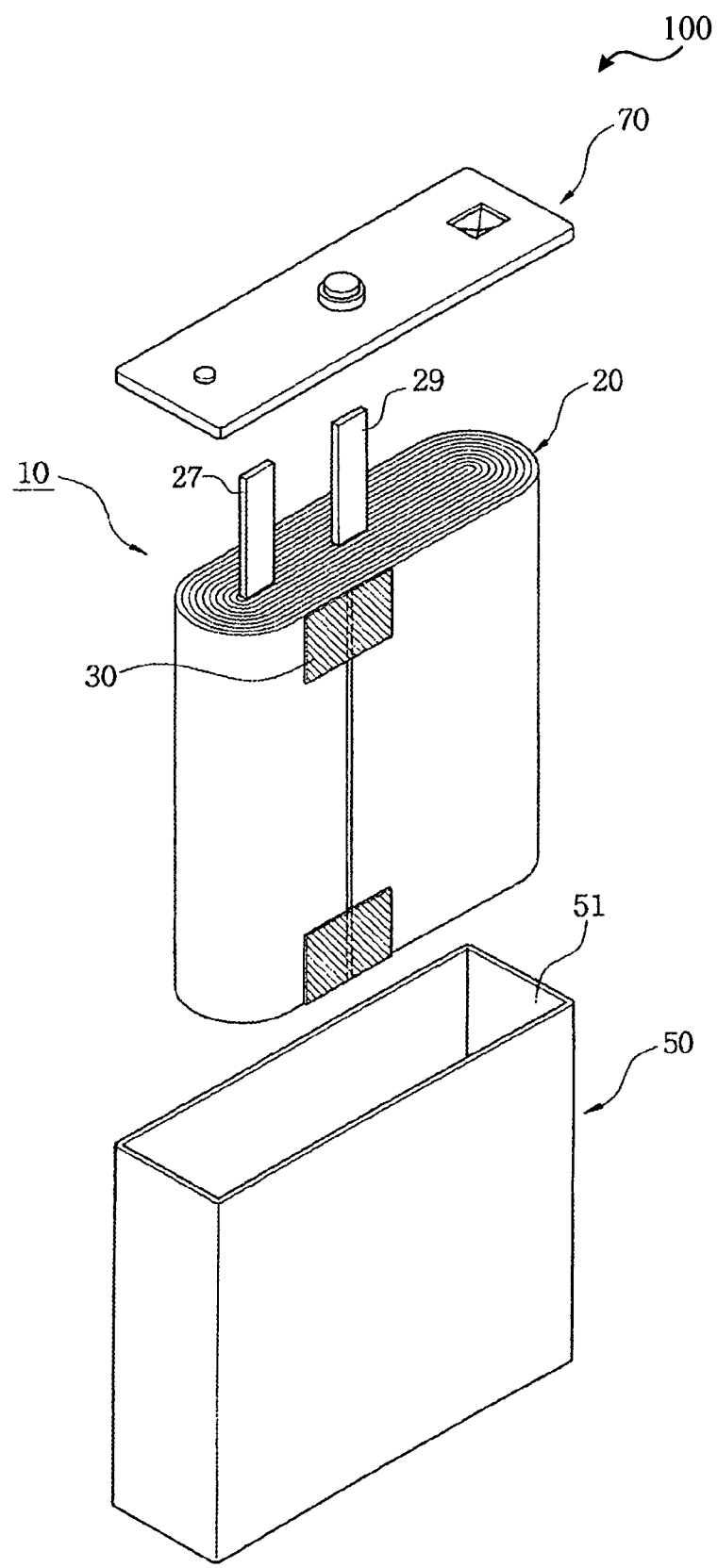
FIG. 5 is an exploded perspective view of a secondary battery having an electrode assembly according to an exemplary embodiment of the present invention.

FIG. 5 is an exploded perspective view of a secondary battery having an electrode assembly according to an exemplary embodiment of the present invention.

Referring to FIG. 5, a secondary battery 100 includes an electrode assembly 10, a case 50 accommodating the electrode assembly 10, and a cap assembly 70 sealing the case 50.

The electrode assembly 10 has the same configuration as that described with reference to any one of FIGS. 1 thru 4, and is accommodated in the case 50.

The case 50 has, at one side, an opening 51 which accommodates the electrode assembly 10.

The cap assembly 70 is disposed over the opening 51 when the electrode assembly 10 is accommodated in the can 50, and thus the can 50 is sealed.

In the latter regard, and referring to any one of FIGS. 1 thru 4, a separator 23 of an electrode group 20 of the electrode assembly 10 is attached and fixed to an outermost electrode plate of the electrode group 20 by a tape 30 at upper and lower parts or an entire part of an end of the separator 23.

Thus, contraction of the separator and a short circuit between first and second electrode plates 21 and 25 can be prevented.

Upper and lower parts, or an entire part of an end of a wound separator, are fixed by tape, and thereby contraction of the separator can be prevented, and thus a short circuit between first and second electrode plates 21 and 25 can be prevented.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. An electrode assembly, comprising:
an electrode group formed by stacking a first electrode plate, a separator and a second electrode plate and winding the first electrode plate, the separator and the second electrode plate in a predetermined winding direction, with an end of the separator being exposed by the first and second electrode plates and is folded backward with respect to the winding direction to cover both inner and outer surfaces of an end of an outermost electrode plate of the electrode group, with the wound electrode group comprising two opposite and spaced-apart surfaces separated by a side surface which connects the two opposite and spaced-apart surfaces; and
a first tape being directly attached to an uppermost part of the exposed end of the separator disposed on the side surface of the electrode group, and a second tape being directly attached to a lowermost part of the exposed end of the separator disposed on the side surface of the electrode group and the first and second tapes exposing a middle portion of the exposed end of the separator disposed between the uppermost part and the lowermost part of the exposed end of the separator disposed on the side surface of the electrode group.

2. The electrode assembly according to claim 1, wherein the uppermost part and the lowermost part of the exposed end of the separator are fixed to the outermost electrode plate of the electrode group by the first and second tapes.

3. The electrode assembly according to claim 1, wherein the first and second tapes are further attached to a part of an end of the electrode group other than an uppermost part and a lowermost part of the end of the electrode group.

4. The electrode assembly according to claim 1, wherein the first and second tapes laterally surround an uppermost part and a lowermost part of an end of the electrode group, including the end of the electrode group along the winding direction of the electrode group.

5. A secondary battery, comprising:
an electrode assembly comprising:
an electrode group formed by stacking a first electrode plate, a separator and a second electrode plate and winding the first electrode plate, the separator and the second electrode plate in a predetermined winding direction, with an end of the separator being exposed by the first and second electrode plates and is folded backward with respect to the winding direction to cover both inner and outer surfaces of an end of an outermost electrode plate of the electrode group, with the wound electrode group comprising two opposite and spaced-apart surfaces separated by a side surface which connects the two opposite and spaced-apart surfaces, and
a first tape being directly attached to an uppermost part of the exposed end of the separator disposed on the side surface of the electrode group, and a second tape being directly attached to a lowermost part of the exposed end of the separator disposed on the side surface of the electrode group and the first and second tapes exposing a middle portion of the exposed end of the separator disposed between the uppermost part and the lowermost part of the exposed end of the separator disposed on the side surface of the electrode group;
a case accommodating the electrode assembly; and
a cap assembly sealing the case.

6. The secondary battery according to claim 5, wherein the uppermost part and the lowermost part of the exposed end of the separator are fixed to the outermost electrode plate of the electrode group by the first and second tapes.

7. The secondary battery according to claim 5, wherein the first and second tapes are further attached to a part of an end of the electrode group other than an uppermost part and a lowermost part of the end of the electrode group.

8. The secondary battery according to claim 5, wherein the first and second tapes laterally surround an outer surface of the electrode group, including an end of the electrode group along the winding direction of the electrode group.

* * * * *